(12) United States Patent
Inoue et al.

(10) Patent No.: US 6,680,590 B2
(45) Date of Patent: Jan. 20, 2004

(54) VIBRATION MOTOR AND APPARATUS USING THE SAME

(75) Inventors: Tomohiro Inoue, Tottori (JP); Yoshiaki Iwayama, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 138 days.

(21) Appl. No.: 10/032,750

(22) Filed: Dec. 28, 2001

(65) Prior Publication Data

US 2002/0121870 A1 Sep. 5, 2002

(30) Foreign Application Priority Data

Dec. 28, 2000 (JP) .......................... 2000-400385

(51) Int. Cl.[7] .................. H02K 33/02; B26B 19/28
(52) U.S. Cl. ................. 318/114; 318/112; 318/113; 318/128; 318/130; 310/361
(58) Field of Search ................. 318/112, 113, 318/114; 310/361

(56) References Cited

U.S. PATENT DOCUMENTS

| | | | |
|---|---|---|---|
| 5,616,996 A | 4/1997 | Tang et al. | 310/739 |
| 5,736,797 A | 4/1998 | Motohashi et al. | 310/36 |
| 5,866,998 A | 2/1999 | Menegoli | 318/254 |
| 5,943,214 A | 8/1999 | Sato et al. | 361/752 |
| 6,031,316 A | 2/2000 | Kataoka | 310/316 |

FOREIGN PATENT DOCUMENTS

| | | |
|---|---|---|
| JP | 55-109185 | 8/1980 |
| JP | 02206394 | 8/1990 |
| JP | 03089889 | 4/1991 |
| JP | 5-304744 | 11/1993 |
| JP | 08-149182 | 6/1996 |
| JP | 09-130840 | 5/1997 |

OTHER PUBLICATIONS

International Search Report dated Jul. 30, 2002 in corresponding International Application No. PCT/JP01/11497.

*Primary Examiner*—Karl Tamai
*Assistant Examiner*—Iraj A. Mohandesi
(74) *Attorney, Agent, or Firm*—RatnerPrestia

(57) ABSTRACT

A vibration motor obtains a FAST signal when r.p.m. of the motor is faster than reference speed, whereby an output-driving circuit is controlled by the FAST signal to omit parts of the powering periods of respective phases. The motor thus controls the r.p.m. and increases torque ripple generated from the motor. As a result, vibration magnitude increases and insufficient vibration due to downsizing of the motor can be compensated by the control system. A motor driver can be formed with a one chip semiconductor device, so that the number of exterior components is reduced and the motor can be downsized and have light weight

27 Claims, 14 Drawing Sheets

VIBRATION MOTOR AND APPARATUS USING THE SAME

TECHNICAL FIELD

The present invention relates to an information apparatus which transmits information to a user by body sensation of vibration. For example, it relates to a vibration motor and an apparatus using this motor, such as a cellular phone, an information terminal and a watch and so on. The motor and the apparatus can be smaller, save space, consume less power and have additional functions.

Particularly, the vibration motor in this invention is formed of a brushless motor without using a position-detector of a rotor, and this vibration motor is suitable for detecting back-electromotive-force (BEMF) and to be driven. This vibration motor is equipped with a motor driver which realizes various controls such as speed-control, short brake, forward rotation, reverse rotation, start and stop and so on.

BACKGROUND ART

A conventional sensorless-brushless-motor driver which has no position-detecting device is described as follows. When the motor rests or rotates very slowly, such that back-electromotive-force (BEMF) generated at driving coils of the motor cannot be detected, an ON-OFF state of the driving-coil of each phase is switched sequentially by supplying timing pulses from outside. The motor then starts from its resting state. Such starting-circuit means is disclosed in Japanese Patent Application Non-Examined Publication No. H02-206394. Driving-circuit means, which detects BEMF generated at driving-coil and produces optimum driving timings after the motor starts, is known in Japanese Patent Application Non-Examined Publication No. H03-89889.

It is known using means that BEMF (voltage value) of the motor is proportional to the r.p.m. of a motor as speed-control means of the motor. As a vibration device, means of setting frequency and amplitude of vibration arbitrarily is disclosed in Japanese Patent Application Non-Examined Publication No. H08-149182. Means for changing vibration depending on the time is disclosed in Japanese Patent Application Non-Examined Publication No. H09-130840.

FIG. 12 is a driving circuit diagram of a vibration motor (sensorless-brushless-motor) in accordance with a first prior art example.

As shown in FIG. 12, each terminal of stator coils 802, 803 and 804 is connected with power-input terminal 303. BEMF generated from each coil 802, 803 and 804, are converted to rectangular pulses by comparators 721, 722 and 723, which are then input to timing circuit 113. Timing circuit 113 delays leading edges and trailing edges of the rectangular pulses by electrical angle 30 degrees and produces timing signals to start powering.

Phase-switching circuit 114 inputs the timing signals from timing circuit 113 and outputs phase-switching signals to power amplifier 740. Phase-switching circuit 114 supplies base electric currents to transistors 792, 793 and 794 forming output-circuit 115 during 120 degree in electrical angle through power amplifier 740. Electric currents are carried in coils 802, 803 and 804 sequentially at the timings produced by timing circuit 113 during 120 degree in electrical angle respectively.

Power amplifier 740 is formed such that it can control the base electric current of transistors 792, 793 and 794 based on an output signal of error amplifier 780. Feedback is controlled such that the motor can rotate at the r.p.m. where reference voltage 781 and synthesized voltage are balanced, whereby synthesized voltage is synthesized between an output voltage of FV(frequency/voltage)-converting circuit 770 and an applied voltage of control-input terminal 701. FV converting circuit 770 converts amplitude of BEMF generated at coils 802, 803, and 804 to a voltage and outputs the resultant voltage during off-time of transistors 792, 793 and 794. In other words an r.p.m. of the motor is converted to the voltage by FV converting circuit 770, and the voltage feedbacks to error amplifier 780 which controls motor operating current, so that a closed loop circuit is formed. The r.p.m. of the motor is then controllable by an applied to voltage to controlling-input terminal 701.

Capacitor 901 is used for a starting-oscillator. Capacitor 902 is used for producing ON-OFF-timing. Capacitor 903 is used for compensating phase of closed loop. Oscillating-circuit 710, power supply 750, switch 751 and resistor 761 are used for starting motor. The description of these elements are omitted here.

FIG. 13 is a circuit diagram of a vibration device in accordance with a second conventional example. FIG. 14 is a circuit diagram of a vibration device in accordance with a third conventional example.

As shown in FIG. 13, motor 1 of the second conventional example is equipped with vibration-generating means (not shown) formed of unbalanced load at a rotor, and generates vibration by rotating the motor. Battery 2 is a secondary battery, e.g. a lithium ion battery. Transistor 11 is coupled between battery 2 and motor 1, and transistor 12 and resistor 21 are coupled in series between them. Selecting terminal 31 or 32 is brought into contact with the minus side of the battery, thereby selecting a magnitude of vibration.

In the third conventional example shown in FIG. 14, a section, which corresponds to resistor 21 of the second conventional example of FIG. 13, is replaced with variable resistor 24. A resistor value to be inserted to motor 1 in series is arbitrarily changeable by changing a value of variable resistor 24 with a signal of controlling-input terminal 33, whereby a vibration magnitude and a vibration period are changeable FIG. 15 is a speed-controlling circuit diagram of a vibration device in accordance with a fourth conventional example and disclosed in Japanese Patent Application Non-Examined Publication No. S55-109185. FIG. 16 is a speed-error-detecting circuit diagram of the vibration device.

As shown in FIG. 15, first regular pulse-width-producing circuit 405 comprises N-ary counter, which uses a trailing edge of output signal of pulse-forming circuit 403 as a trigger signal.

The N-ary counter holds level "1" while the counter counts a number of output pulse of reference oscillator 108, namely a reference clock, up to N pulses, and holds level "0" after counting N pulses. Second regular pulse-width-producing circuit 406 comprises M-ary counter, which uses a trailing edge of an output signal of first regular pulse-width-producing circuit 405 as a trigger signal. The M-ary counter holds level "1" while the counter counts a number of reference clock up to M pulses, and holds level "0" after counting M pulses. Pulse-synthesizing circuit 407 synthesizes output pulses of regular pulse-width-producing circuits 405 and 406, and converts it to a pulse width corresponding to a speed error of motor 401. In other words, speed-error-detecting circuit 411 comprises pulse-width-producing circuits 405, 406 and pulse-synthesizing circuit 407.

Filter circuit 408 smoothes an output pulse of pulse-synthesizing circuit 407 and converts it to a direct current voltage. Low-frequency-compensating circuit 409 amplifies low frequency component of outputs from filter circuit 408. Motor-driving circuit 410 amplifies output power of low-frequency compensating circuit 409.

FIG. 16 is a diagram of speed-error-detecting circuit 411 in FIG. 15. As shown in FIG. 16, N-ary counter 421 has reference-clock-input terminal CK, output terminal DOB and clear terminal CL. Differentiating circuit 422 differentiates a trailing of a signal entering point B, and outputs a trigger signal. Set-Reset flip-flop (SR flip-flop) circuit 423 resets and sets responsive to the trigger signal at level "0". First regular pulse-width-producing circuit 405 is composed of counter 421, differentiation circuit 422 and RS flip flop 423. Contents of the second regular pulse-width-producing circuit 406 are the same as first regular pulse-producing circuit 405 except count numbers N and M.

Resistors 426 and 427 supply a current to each base of PNP transistor 430 and NPN transistor 431. Resistors 428 and 429 prevent leak electric currents of transistors 430 and 431. Pulse synthesizing circuit 407 comprises OR circuit 424, AND circuit 425, resistors 426, 427, 428, 429 and transistors 430, 431.

A voltage level of collector-common-connecting-point G of both the transistors mentioned above can be hold at the following three states. When an r.p.m. of the motor is faster than a reference speed, an output cycle of frequency generator 402 in FIG. 15 is shorter than a reference cycle made by adding a number of pulses counted by N-ary counter and that of by M-ary counter. In this case, point G, which is an output point of pulse synthesizing circuit 407, operates in electric-current-absorbing mode and absorbs an electric current from filter circuit 408, thereby reducing an output voltage of filter circuit 408. As a result, the r.p.m. of motor 401 decreases through low frequency compensating circuit 409 and motor-driving circuit 410, and the output cycle of frequency-generator 402 becomes longer.

On the contrary, when the r.p.m. of the motor is slower than the reference speed, point G operates in electric-current-bursting mode and raises an output voltage of filter circuit 408. As a result, the r.p.m. of motor 401 increases through low frequency compensating circuit 409 and motor-driving circuit 410, and the output cycle of frequency-generator 402 becomes shorter.

When motor 401 rotates (at the reference speed) constantly, transistors 430 and 431 continue off-states and become high impedance states, so that an input and an output of electric current at point G is disappears and the output voltage of filter circuit 408 keeps a constant level. As a result, the r.p.m. of motor 401 keeps constant.

However, when the conventional sensorless-brushless-motor driver is formed of a one chip semiconductor device (IC), starting-circuit capacitor 901, ON-OFF-timing-producing capacitor 902 and closed-loop-phase-compensating capacitor 903 are difficult to be put inside the IC. Because these capacitors are required to have at least 1 nF, the sizes of the capacitors may become big. The capacitors are thus exterior to the IC.

A starting-circuit of the conventional sensorless-brushless-motor driver produces reference clock with a CR oscillator comprising a capacitor and a resistor. The reference clock should be a low frequency (approx. several tens Hz—several hundreds Hz).

In such a case, a capacity of the capacitor should be increased, therefore it is difficult for the IC to integrate the capacitor, and a capacitor having a large capacity is typically required to be a component exterior to the IC. A charge and a discharge current are desirably small in order to produce a low frequency reference clock when a capacity of the capacitor is small, whereby accuracy of oscillation degrades due to the influence by a fine leak electric current.

Motor-speed-control means of the first conventional example in FIG. 12 uses the fact that a voltage level of BEMF of the motor is proportional to an r.p.m. of a motor. Even if a reference voltage corresponding to a reference r.p.m. of a motor is designed precisely in the IC, BEMF of the motor depends on characteristics of the motor. The reference voltage suited to the characteristics of the motor is required because the r.p.m. changes in accordance with a change of the characteristics of the motor.

In a small vibration motor driving system recently used in a small and a light weight apparatus, when the number of exterior components are reduced for downsizing and weight reduction, a dispersion of the r.p.m. of the motor occurs in manufacturing motors, because the r.p.m. is determined by the characteristics of the motor as discussed above.

One of conventional apparatuses aims at better performance for users to select vibration perceivable easily or the appratus increases magnitude of vibration gradually. Conventional r.p.m. control means based on the voltage of BEMF changes the r.p.m. by changing a direct current voltage level after supplying the direct current voltage level functioning as a speed-instruction from the outside. In such a case, the r.p.m. depends on respective motors, because r.p.m. accuracy disperses depending on the characteristics of the motor.

SUMMARY OF THE INVENTION

A vibration motor comprises the following elements:
(a) a rotor having an unbalanced load,
(b) a stator having a plurality of coils having different phases respectively and
(c) a motor driver coupled with the coils and rotating the rotor.

The motor driver including;
(c-1) a starting-circuit for applying starting torque to the motor;
(c-2) a back-electromotive-force(BEMF)-detecting circuit for detecting BEMF of each phase of the motor and outputting BEMF signals corresponding to the BEMF;
(c-3) an output-driving circuit having;
a timing-generating circuit for producing at least one signal to switch An ON-OFF state sequentially for the coils based on the BEMF signals, and
(c-4) a speed-controlling circuit having a reference-cycle-generating circuit for generating a reference cycle signal and a cycle-comparing circuit for comparing a cycle of the reference cycle signal with a cycle of the BEMF detecting signal so that ON-OFF period to power said coils is effected responsive to output from said cycle comparing circuit.

DETAILED DESCRIPTION OF THE PREFERRED EMBODIMENTS

Exemplary Embodiment 1

Figure 1:
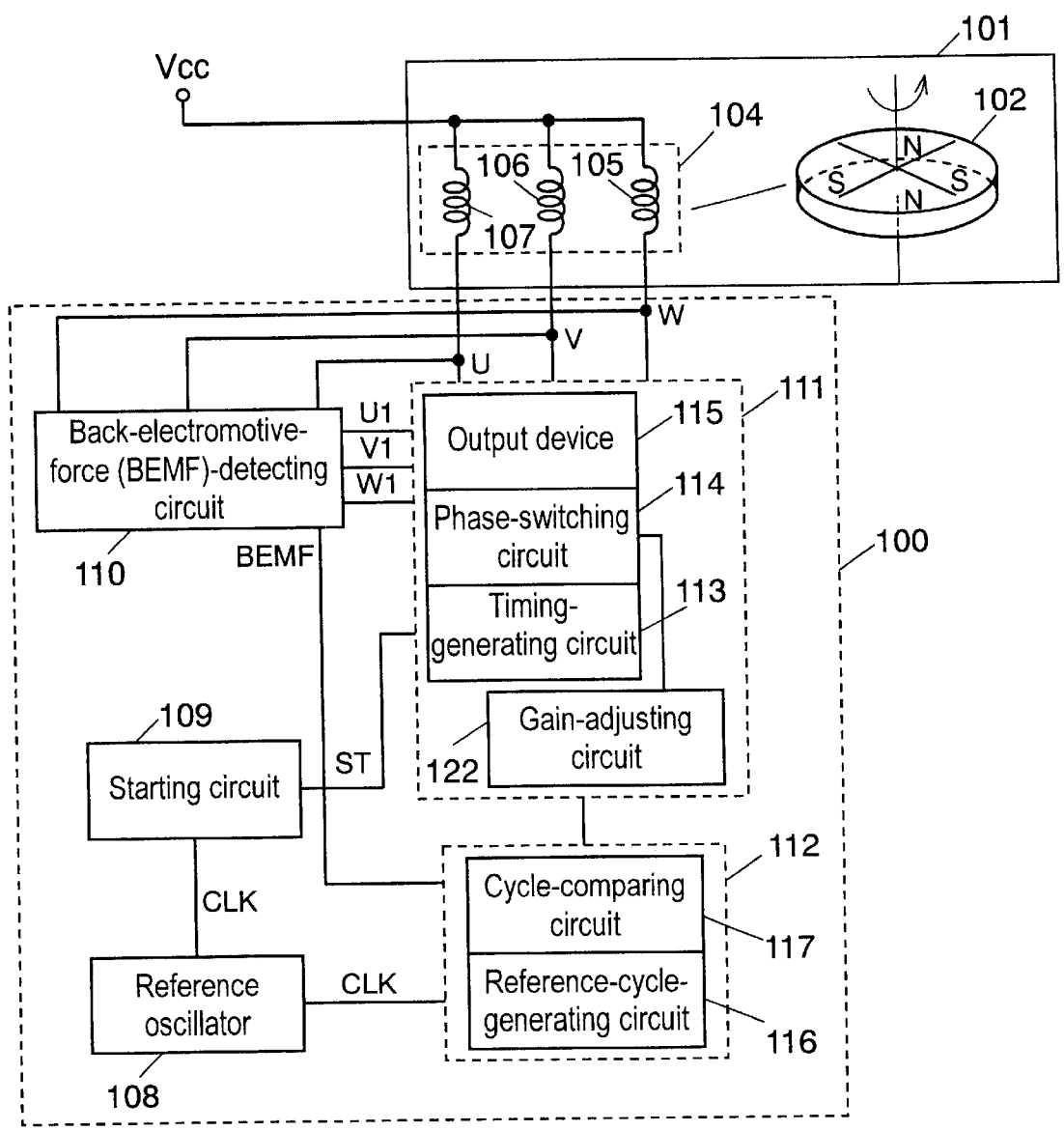
FIG. 1 illustrates a block diagram of a vibration motor in accordance with a first exemplary embodiment of the present invention.
Figure 2:
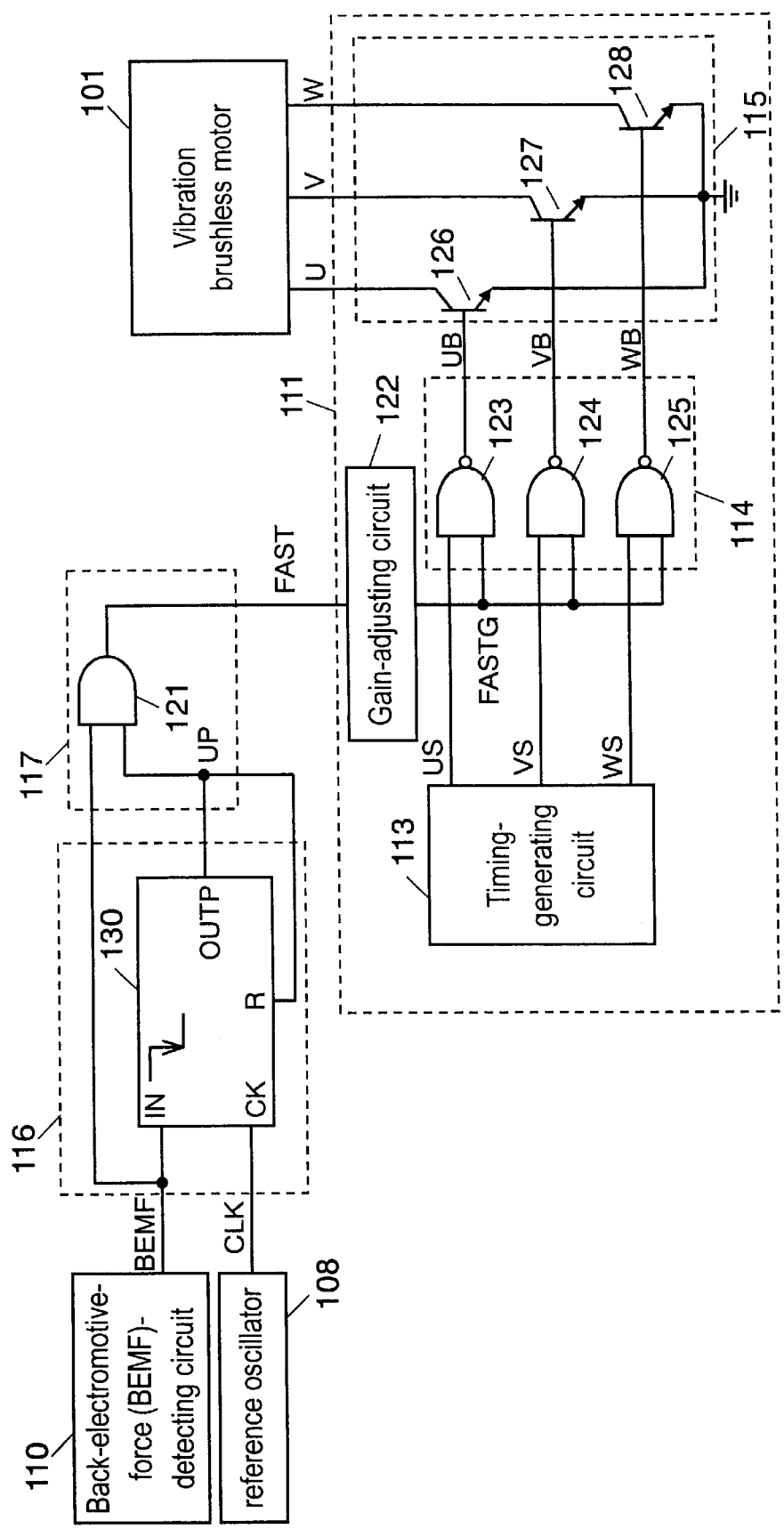
FIG. 2 is block diagrams including a speed controlling circuit and a driving circuit of the vibration motor shown in FIG. 1.
Figure 3:
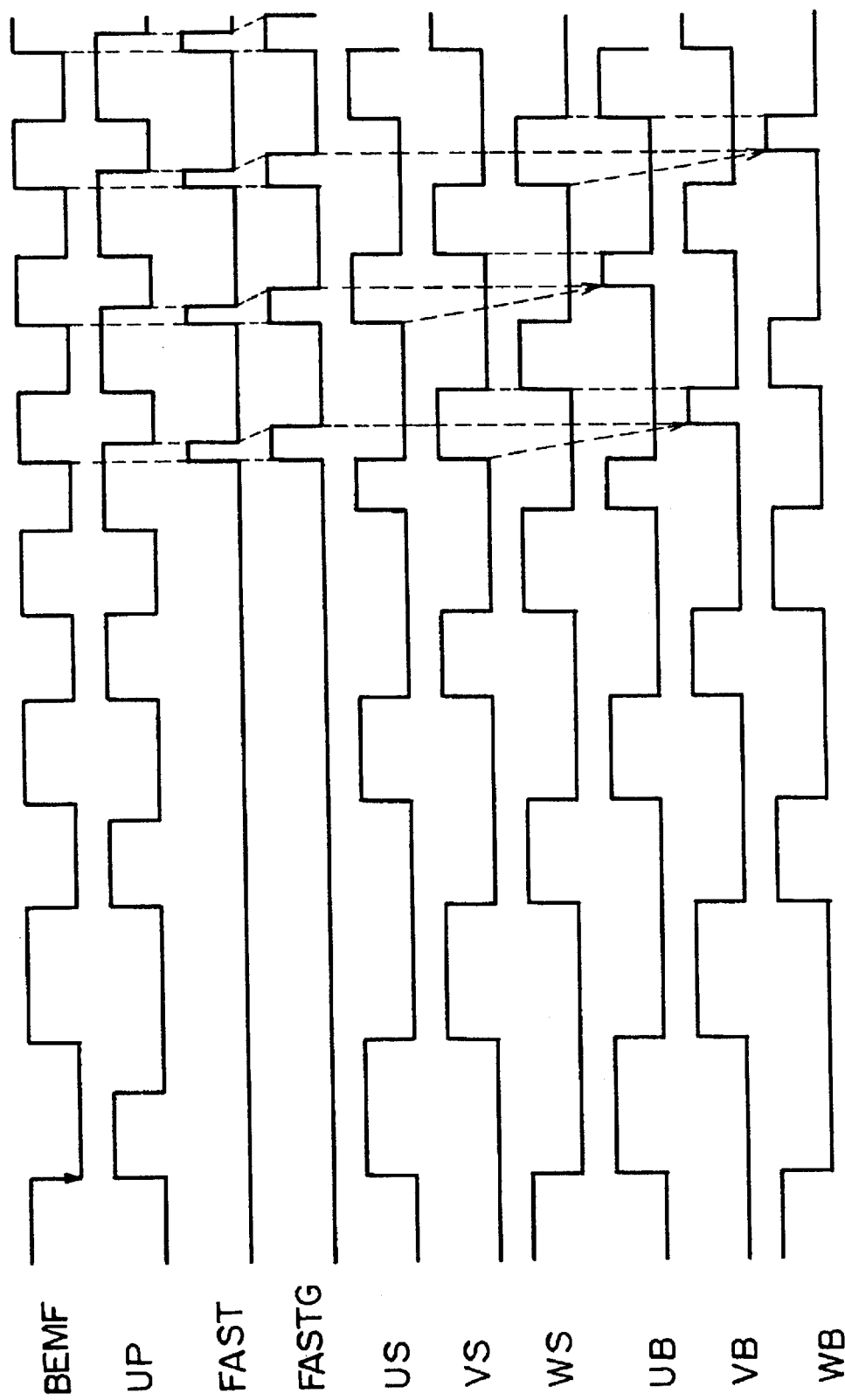
FIG. 3 shows a timing chart for speed controlling and motor driving of the vibration motor shown in FIG. 1.

FIG. 1 illustrates a block diagram of a vibration motor in accordance with the first exemplary embodiment of the present invention, and FIG. 2 is block diagrams including a speed controlling circuit and a driving circuit of the vibration motor, FIG. 3 is a timing chart for speed controlling and motor driving of the vibration motor.

As shown in FIG. 1, vibration motor 101 is a sensorless-brushless-motor having no position-detecting device. Rotor 102 has an unbalanced load (not shown) as vibration generating means. Rotation of rotor 102 causes the unbalanced load to spin, thereby producing vibration. Stator 104 is wound by a plurality of coils having different phases respectively, i.e., stator coils (driving coils) 105, 106 and 107, which form phase U, phase V, and phase W.

Respective first terminals of coils 105, 106 and 107 are coupled to voltage supply terminal Vcc. Respective second terminals of these coils are coupled to BEMF detecting circuit 110.

Motor driver 100 of the vibration motor in the first embodiment is demonstrated hereinafter. BEMF detecting circuit 110 detects BEMF generated from the respective coils and outputs BEMF detecting signals, e.g., rectangular pulse signals U1, V1, W1, and outputs a synthesized signal BEMF of three phases at the same time.

Speed controlling circuit 112 includes reference cycle generating circuit 116 and cycle-comparing circuit 117. Reference cycle generating circuit 116 sets a reference cycle based on signal BEMF and reference clock CLK supplied from reference oscillator 108. Cycle-comparing circuit 117 outputs a rectangular wave signal FAST corresponding to a difference between the cycle of the BEMF signal and the cycle of the reference signal only when the cycle of the BEMF signal is shorter than that of the reference cycle.

Output-driving circuit 111 includes timing-generating circuit 113, phase-switching circuit 114, output device 115 and gain-adjusting circuit 122. Timing producing circuit 113 delays leading edges and trailing edges of signal U1, V1 and W1 by 30 degree in electrical angle, and produces timing signals to start powering. Gain-adjusting circuit 122 adjusts gain based on the timing signals and the FAST signal. Phase-switching circuit 114 produces phase switching signals by the adjusted rectangular signals. Output device 115 controls driving currents to coils 105, 106 and 107 by the phase switching signals.

Starting circuit 109 functions as follows. When motor 101 rests or rotates very slowly, and can't detect BEMF generated at respective coils 105, 106 and 107, starting circuit 109 produces timing pulses (starting pulses) based on reference clock CLK, and An ON-OFF state of respective phase coils are switched sequentially, whereby motor 101 starts from the resting states easily.

The operation of driving the motor and controlling a speed of the motor are demonstrated hereinafter with reference to FIGS. 2 and 3.

Counter 130 included in reference-cycle-generating circuit 116 starts counting reference clock CLK supplied from reference oscillator 108 when a trailing edge of a synthesized signal BEMF of three phases supplied from BEMF circuit 110 arrives at counter 130. Counter 130 keeps outputting "1" as signal UP until it reaches the set count number. Counter 130 resets itself and outputs "0" as signal UP at the time it reaches the set count number.

Cycle-comparing circuit 117 is formed of AND gate 121. Cycle-comparing circuit 117 receives the BEMF signal and the UP signal, and outputs a signal to gain-adjusting circuit 122 of output controlling circuit 111. A signal of "1" is supplied as a FAST signal only when both the BEMF signal and the UP signal stay "1". When a cycle of the BEMF signal is shorter than a reference cycle of set count number, namely when an r.p.m. of the motor is fast, the FAST signal "1" is supplied corresponding to the difference of both the cycles. Gain-adjusting circuit 122 outputs a FASTG signal which is adjusted to lengthen a period of the supplied FAST signal "1".

Phase-switching circuit 114 is formed of NAND gates 123, 124 and 125. When timing signals US, VS and WS of respective phases supplied from timing-generating circuit 113 stay "1", currents are carried. However, when the FASTG signal turns to "1", the timing signals turns to "0". In other words, phase-switching circuit 114 outputs driving signals UB, VB, WB of which powering periods are omitted by the FASTG signal.

Output device 115 is formed of NPN transistors 126, 127 and 128. Driving signals UB, VB and WB modified by the FAST signal are supplied to respective bases of the transistors. Respective transistors drive vibration motor 101 based on respective base signals.

In this structure, when an r.p.m. of the motor 101 is faster than a reference speed, the FAST signal is output. Parts of powering periods are omitted by the FAST signal, whereby the driving torque decreases and the r.p.m. decreases.

When the r.p.m. decreases, the driving torque increases because a width of the FAST signal shortens and the powering periods lengthen. A feedback control thus functions and the r.p.m. of the motor 101 is kept constant.

When gain-adjusting circuit 122 has a structure to lengthen a time width of the FAST signal (to adjust FASTG signal to be lengthen), feedback controlling gain increases equivalently. As a result, a differential of a time width between a reference cycle (speed reference) at a speed-controlling state and a BEMF detecting signal (r.p.m.) shortens, so that the r.p.m. accuracy improves and deviation of an r.p.m. due to load fluctuation decreases.

Torque generated from the motor is decreased and torque ripple generated from a motor is increased by omitting parts of periods which was originally required for powering (120 degree in electric angle at respective phases) responsive to the width of the FAST signal, so that insufficient vibration due to downsizing of motor 101 can be compensated by the control system.

In this example, the structure, i.e., a structure for a half wave driving method is described as follows; the first terminals of respective phase coils are coupled to the voltage supply terminal Vcc, and the second terminals are coupled to respective collectors of the NPN transistors forming output device 115. In addition to this, a structure for a full wave driving method, where both the terminals of respective coils are coupled to respective output devices can produce the same advantage as discussed above.

In this embodiment, speed controlling circuit 112 is described that a cycle of the synthesized signal BEMF of multi phases supplied from the BEMF circuit 110 is used as an r.p.m. detecting signal of the motor. In addition to this, a structure, where a cycle of BEMF generated from an arbitrary phase coil is used as an r.p.m. detecting signal of a motor, can produce the same advantage as discussed above.

Exemplary Embodiment 2

Figure 4:
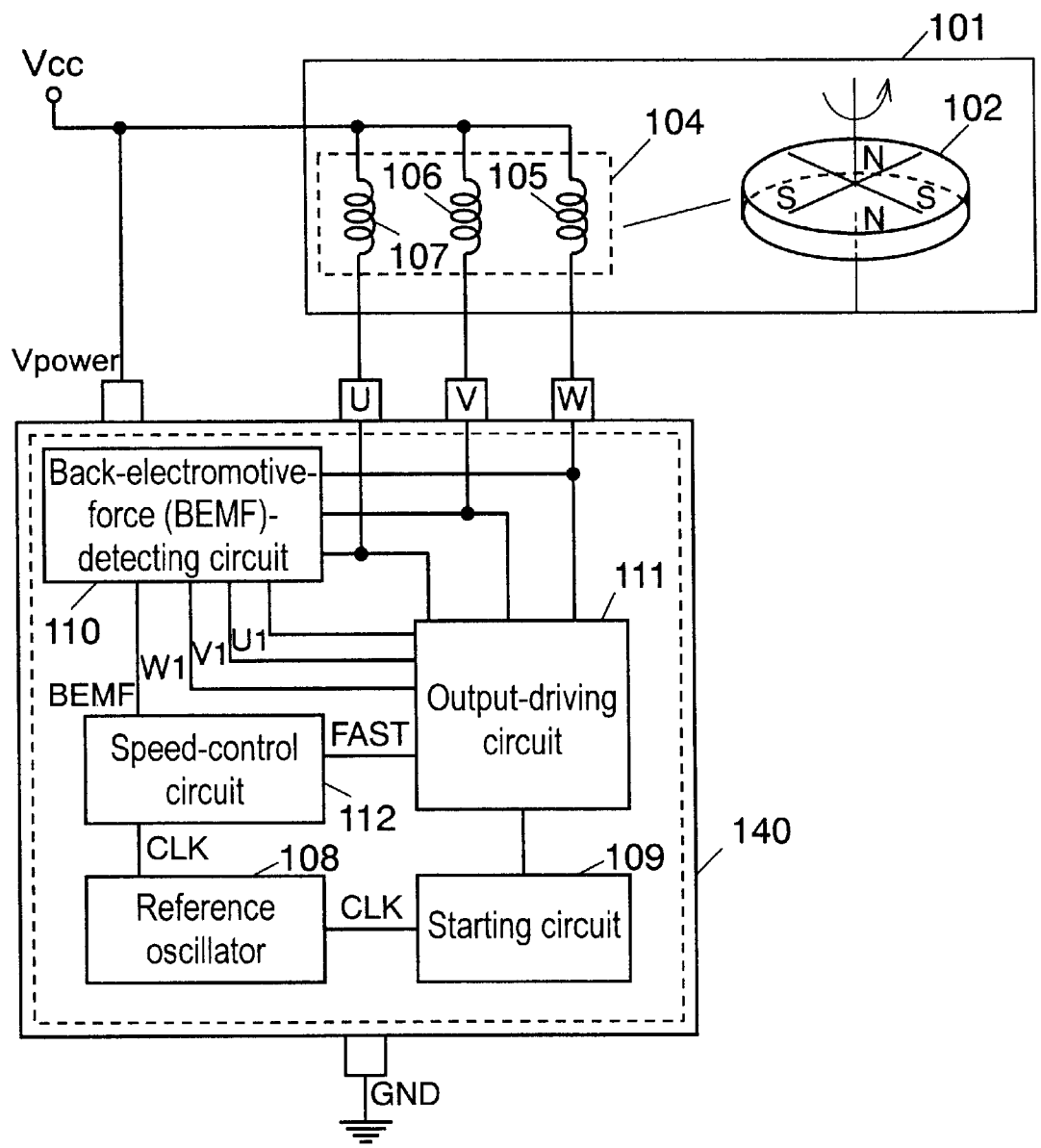
FIG. 4 illustrates a block diagram of a vibration motor in accordance with a second exemplary embodiment of the present invention.

FIG. 4 is a block diagram of a vibration motor in accordance with the second exemplary embodiment of the present invention. This second exemplary embodiment differs from the first one in a motor driver, i.e., the motor driver is formed of one chip semiconductor device 140 which includes back-electromotive-force (BEMF) detecting circuit 110, speed controlling circuit 112, output-driving circuit 111, starting circuit 109 and reference oscillator 108. BEMF detecting circuit 110 detects BEMF generated from respective phase coils 105, 106 and 107 of stator 104 by rotating vibration motor 101. Semiconductor device 140 comprises power supply terminal Vpower, GND terminal and motor driving terminals U, V and W.

Starting circuit 109 receives reference clock CLK from reference oscillator 108 to set a starting frequency. Speed controlling circuit 112 also receives reference clock CLK from reference oscillator 108 to set a reference frequency. Both starting circuit 109 and speed controlling circuit 112 share reference oscillator 108.

In this second exemplary embodiment, a resistor or a capacitor used as an exterior component of semiconductor device 140 is unnecessary, so that an apparatus comprising vibration motor 101 and semiconductor device 140 can be downsized and save space.

Exemplary Embodiment 3

Figure 5:
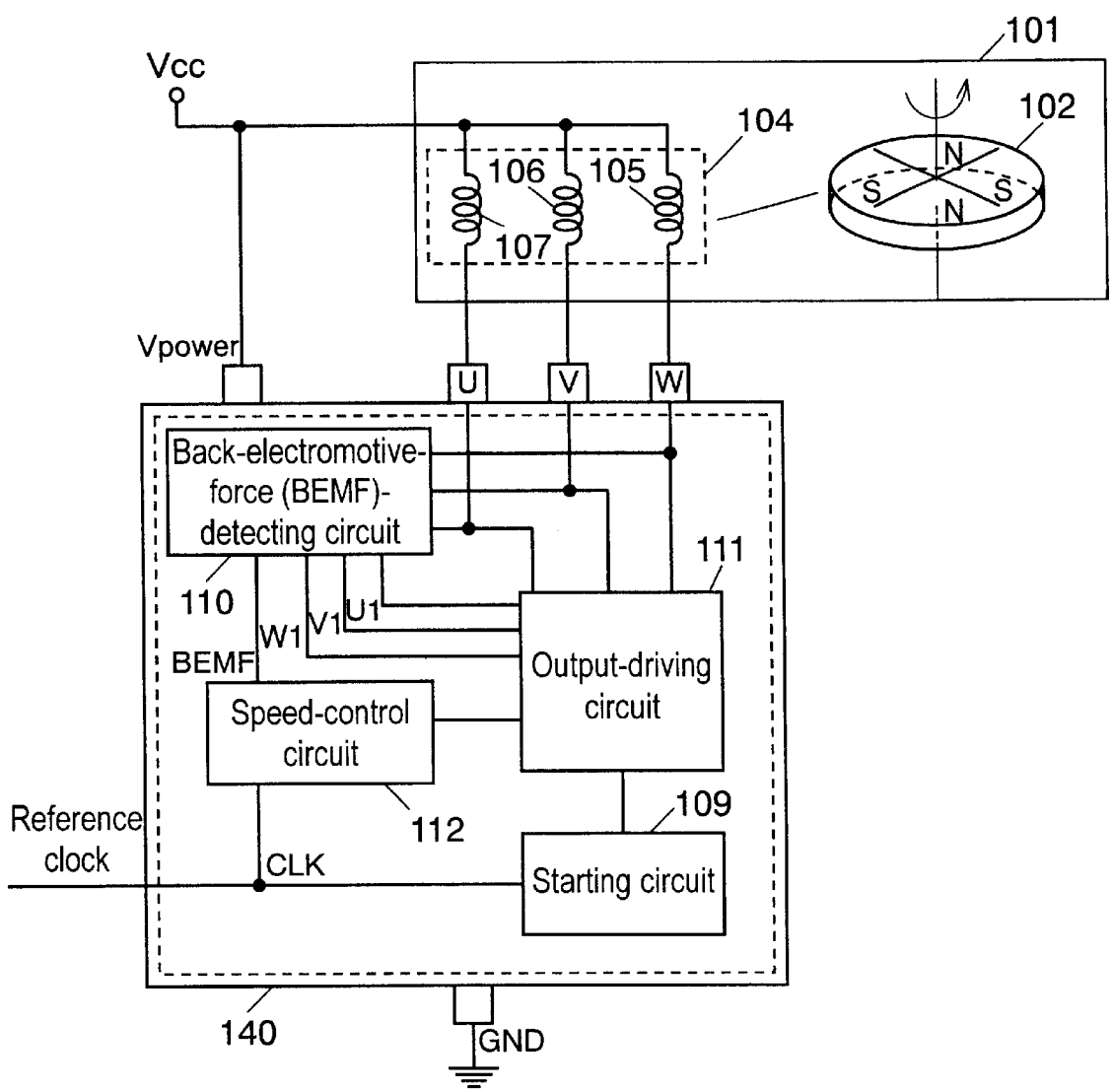
FIG. 5 illustrates a block diagram of a vibration motor in accordance with a third exemplary embodiment of the present invention.

FIG. 5 is a block diagram of a vibration motor in accordance with the third exemplary embodiment of the present invention. This third exemplary embodiment differs from the second one in a motor driver, i.e., a reference clock signal CLK is supplied from outside of one chip semiconductor device 140 as a motor driver.

In this third exemplary embodiment, an r.p.m. can be set arbitrarily because a reference cycle can be set arbitrarily by reference clock CLK supplied from outside.

This third exemplary embodiment can produce the same advantage as the second exemplary embodiment, i.e., an apparatus comprising vibration motor 101 and one chip semiconductor device 140 is downsized and saves space.

Exemplary Embodiment 4

Figure 6:
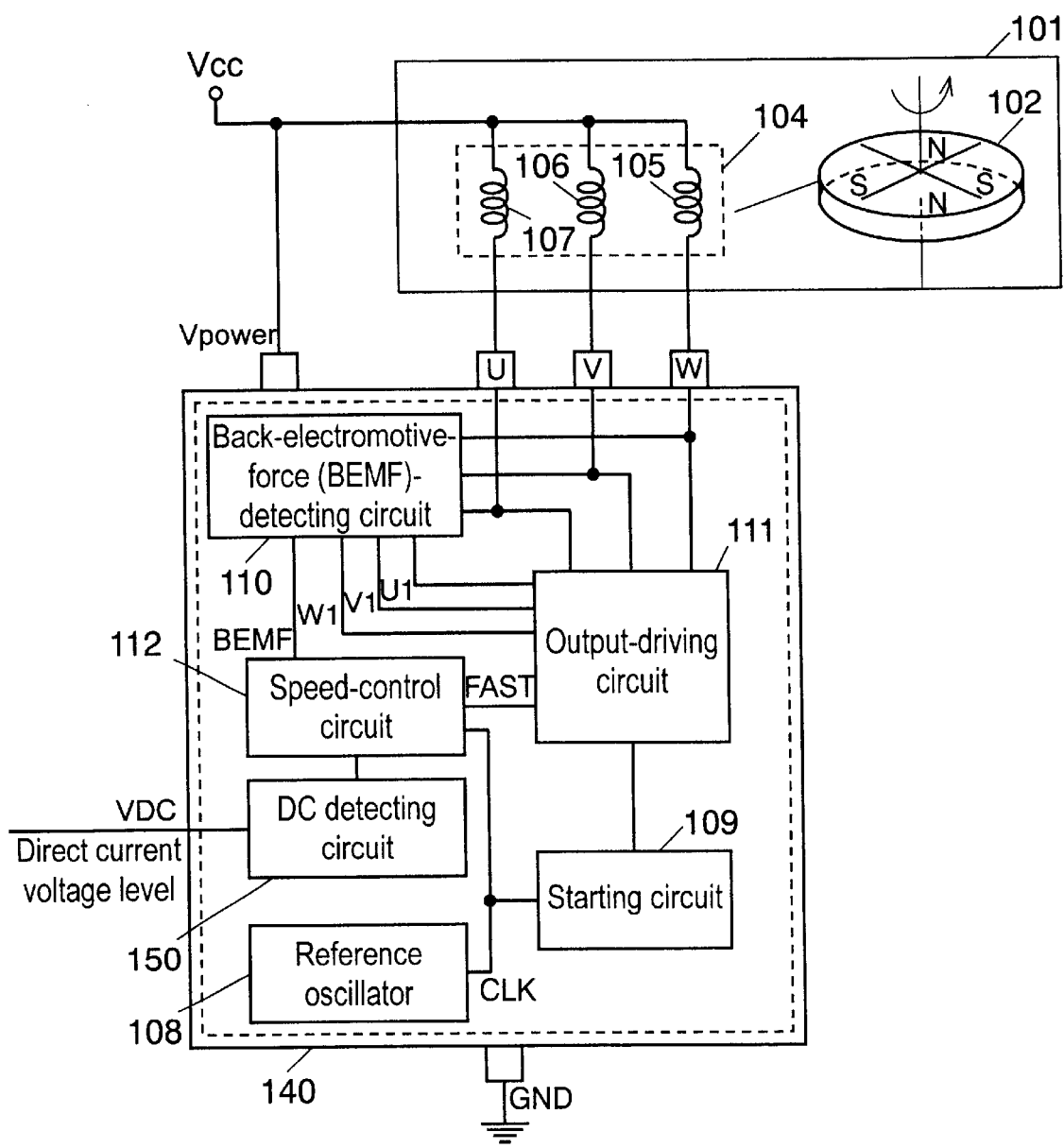
FIG. 6 illustrates a block diagram of a vibration motor in accordance with a fourth exemplary embodiment of the present invention.

FIG. 6 is a block diagram of a vibration motor in accordance with the fourth exemplary embodiment of the present invention. This fourth exemplary embodiment differs from the second one in a motor driver, i.e., direct-current-voltage-level VDC—supplied from an outside of one chip semiconductor device 140 for functioning a motor driver—is detected by DC detecting circuit 150. A reference cycle, a speed reference, which is a reference speed of vibration motor 101, can be set arbitrarily by controlling clock signal CLK of reference oscillator 108 based on an output signal of the detecting circuit 150.

In this fourth exemplary embodiment, an r.p.m. of motor 101 can be set arbitrarily by changing the direct-current-voltage-level VDC supplied from outside.

This fourth exemplary embodiment can produce the same advantage as the second and the third embodiment, i.e., an apparatus comprising vibration motor 101 and one chip semiconductor device 140 is downsized and saves space.

Exemplary Embodiment 5

Figure 7:
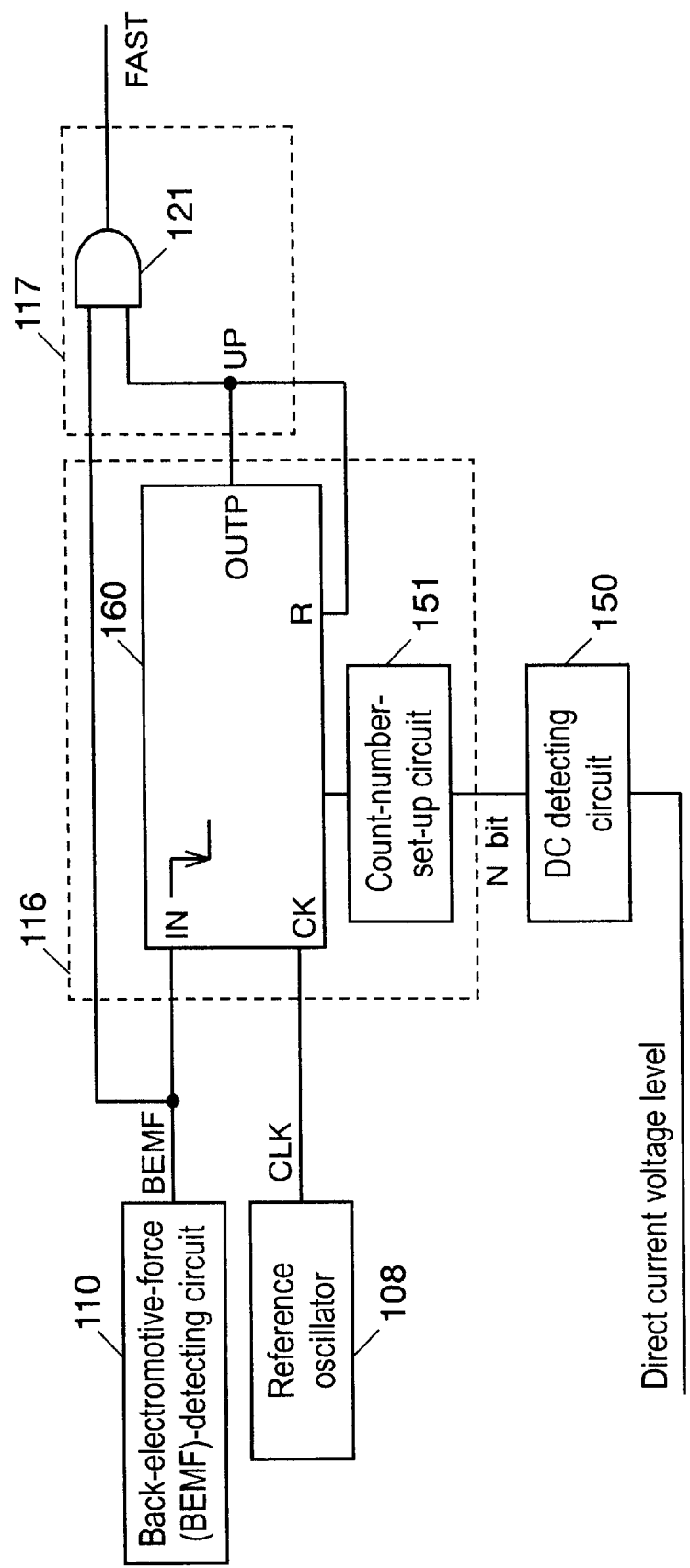
FIG. 7 illustrates a block diagram of a reference-cycle-generating circuit of a vibration motor in accordance with a fifth exemplary embodiment of the present invention.
Figure 8:
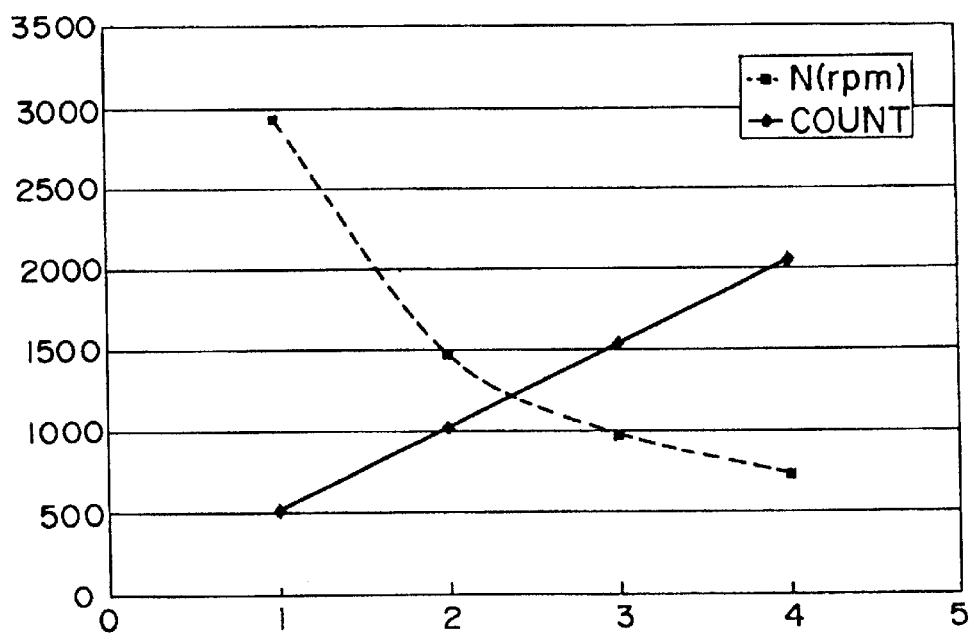
FIG. 8 and FIG. 9 show graphs of r.p.m. vs. count number of the vibration motor in accordance with the fifth exemplary embodiment of the present invention.
Figure 9:
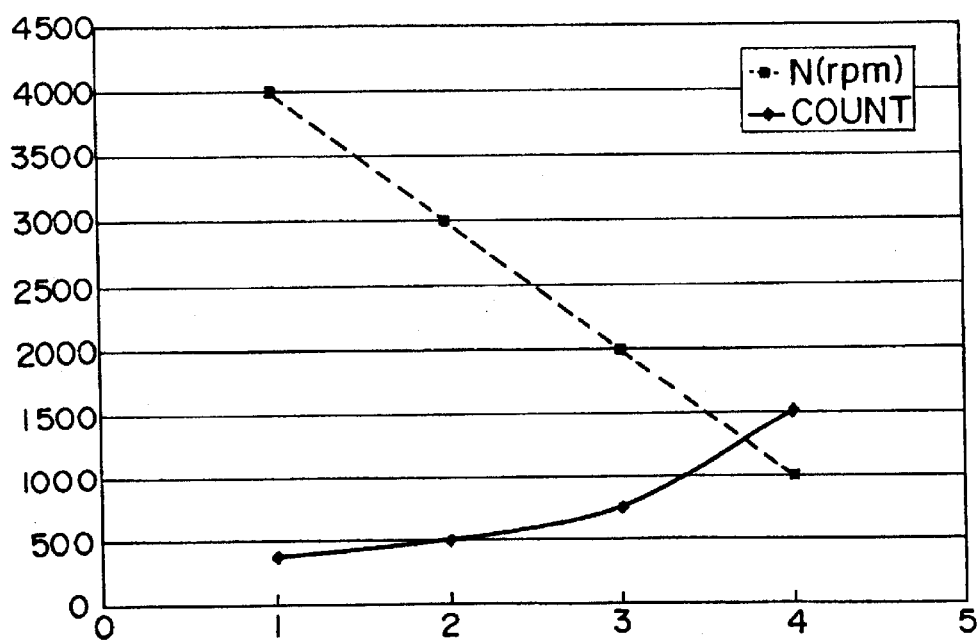

FIG. 7 is a block diagram of a reference cycle generating circuit of a vibration motor in accordance with the fifth exemplary embodiment of the present invention. FIG. 8 and FIG. 9 show graphs of count numbers and r.p.m. of the motor. In FIG. 7, DC detecting circuit 150 is formed of an analog to digital (A/D) conversion circuit for converting a direct voltage level (analog signal) to an N bit signal(digital signal).

Counter 160 included in reference cycle generating circuit 116 counts reference clock CLK supplied from reference oscillator 108, at this time, a trailing edge of signal BEMF synthesized of each back-electromotive-force (BEMF) of respective phases is used as a trigger, where the signal BEMF is supplied from circuit 110.

A count number of count 160 is variable by count-number-set-up circuit 151. An r.p.m. of the motor can be set arbitrarily by changing the count number.

In this fifth exemplary embodiment, a direct voltage level is variable equivalently by changing the count number of counter 160 via DC detecting circuit 150 and count-number-set-up circuit 151, whereby the r.p.m. of the motor is variable.

count-number-set-up circuit 151 is detailed as follows: An r.p.m. of a motor is derived from the following formula.

$$N=(\text{fclk} \times 60)/(p \times \text{COUNT} \times 2)$$

where,

"N" shows an r.p.m,

"fclk" shows a reference clock frequency supplied from reference oscillator 108 (unit: rpm), "p" shows a rotor magnetic number of a motor (unit: Hz), "COUNT" shows a count number of counter 160.

FIG. 8 shows a graph of the count number N, where four count numbers are set at equal intervals as shown in Table 1.

TABLE 1

| A number of a cross axis | COUNT | N(rpm) |
|---|---|---|
| 1 | 512 | 2930 |
| 2 | 1024 | 1465 |
| 3 | 1536 | 977 |
| 4 | 2048 | 732 |

As shown in FIG. 8, "N" is inversely proportional to count number "COUNT" and draws a curve.
In a setting where "N" draws a straight line, FIG. 9 shown in Table 2 is produced.

TABLE 2

| A number of a cross axis | N(rpm) | COUNT |
|---|---|---|
| 1 | 4000 | 375 |
| 2 | 3000 | 500 |
| 3 | 2000 | 750 |
| 4 | 1000 | 1500 |

"N" is variable linearly, when the relation described above is set at count-number-set-up circuit 151.

The relation between a variety of an r.p.m and direct current voltage level supplied from outside can be linear. Besides the relations shown in Table 1 and Table 2, a count-number-set-up circuit has a structure which changes an r.p.m. corresponding to vibration, e.g., a variation of an r.p.m. decreases at a higher rotation speed.

In this fifth embodiment, a speed controlling circuit comprises the reference-cycle-generating circuit, which receives the reference clock from the reference oscillator as an input signal and produces a reference cycle variable to the counter in which an arbitrary count number can be set. The reference-cycle-generating circuit has a count number setting circuit which receives an N bit signal and can set the arbitrary count number by modifying the N bit signal, whereby the reference-cycle-generating circuit outputs the reference cycle signal. The reference frequency (the reciprocal number of the reference cycle) can be set arbitrarily, so that various variable patterns of an r.p.m can be set.

Exemplary Embodiment 6

Figure 10:
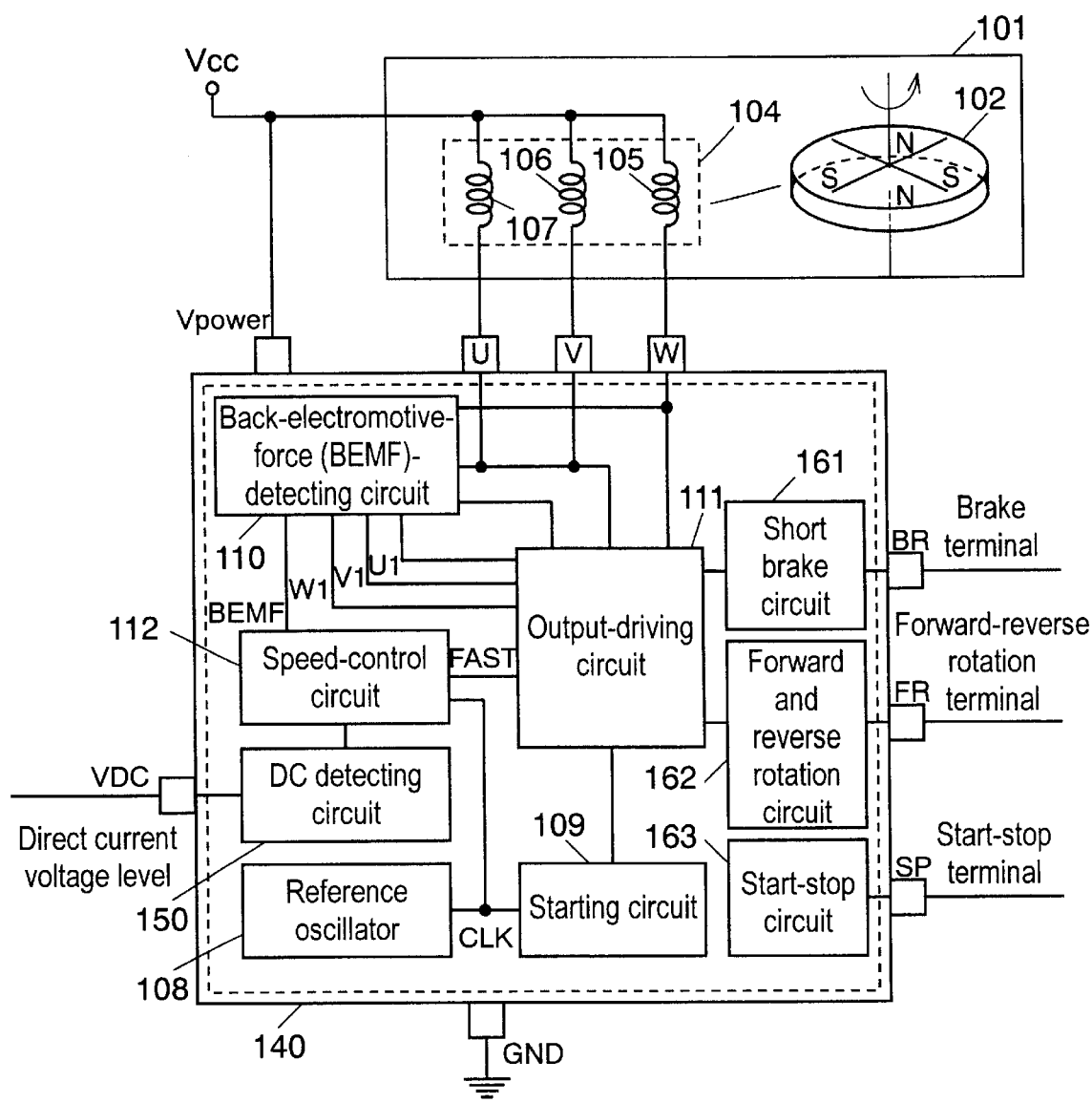
FIG. 10 illustrates a block diagram of a vibration motor in accordance with a sixth exemplary embodiment of the present invention.

FIG. 10 is a block diagram of a vibration motor in accordance with the sixth exemplary embodiment of the present invention. This sixth exemplary embodiment differs from the fourth one in a motor driver, i.e., the motor driver additionally includes brake terminal BR, forward-reverse rotation terminal FR and start-stop terminal SP as the terminals of one chip semiconductor device 140. Semiconductor device 140 additionally includes short brake circuit 161, forward-reverse rotation circuit 162 and start-stop circuit 163.

Short brake circuit 161 shorts output stages of every phase of motor 101, i.e., output terminals U, V, and W of output-driving circuit 111, by supplying a signal to brake terminal BR from outside. Shorting output terminals U, V, and W means shorting back-electromotive-force (BEMF) generated from each of phase coils 105, 106 and 107 of motor 101 through a resisting components included in each coil. Brake torque is operated by a current of each phase coil, whereby motor 101 reduces its speed suddenly and stops. Users can feel changes of vibration of motor 101 effectively due to this fast slowdown.

Forward-reverse rotation circuit 162 switches rotational directions of motor 101 from forward to reverse by supplying a signal to forward-reverse rotation terminal FR from outside. A current is carried in the coils at the timing when reverse torque is generated to a direction of the motor rotation, whereby the motor reduces its speed suddenly by the current, and rotates reversely. Users can feel vibration of the motor more effectively due to the movement of fast slowdown of the motor and the movement of swiching the direction from forward to reverse and vice versa.

Start-stop circuit 163 breaks a driving current of motor 101 by supplying a signal to start-stop terminal SP from outside and breaks a current which is supplied to an inside circuit of semiconductor 140 which works as the motor driver, so that the motor saves power and the life of a battery lengthens when the motor is at rest.

A vibration motor in accordance with the further embodiment of the present invention will be described as follows. A motor driver section of the first to sixth embodiment can be formed in a system-control-integrated-circuit of an apparatus having a motor, e.g., an information apparatus. A system-control-integrated-circuit used in a cellular phone employing e.g., a system-power-supply circuit, a voice transaction circuit and incoming-melody-transaction circuit. The motor driver needs to accommodate a large current, therefore the motor driver is suitable for being integrated the system-control-integrated-circuit including an analog circuit which has sufficient current capacity.

In this case, the apparatus can be further downsized and save more space, because a semiconductor device for exclusively driving a motor is unnecessary.

Exemplary Embodiment 7

Figure 11:
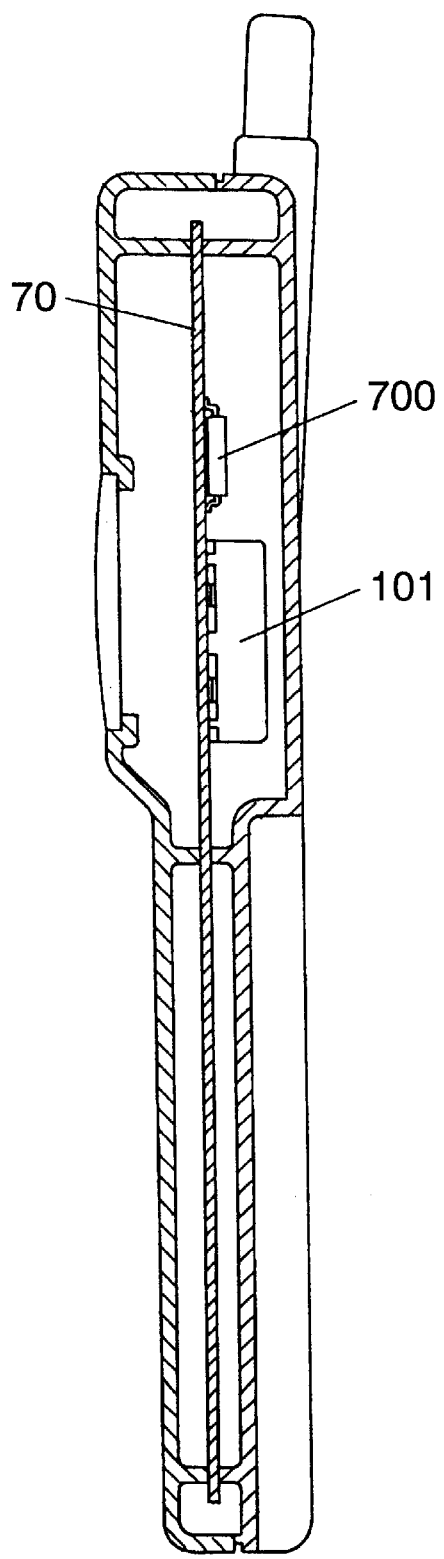
FIG. 11 illustrates a partial sectional view of an apparatus (cellular phone) in accordance with a seventh exemplary embodiment of the present invention.
Figure 12:
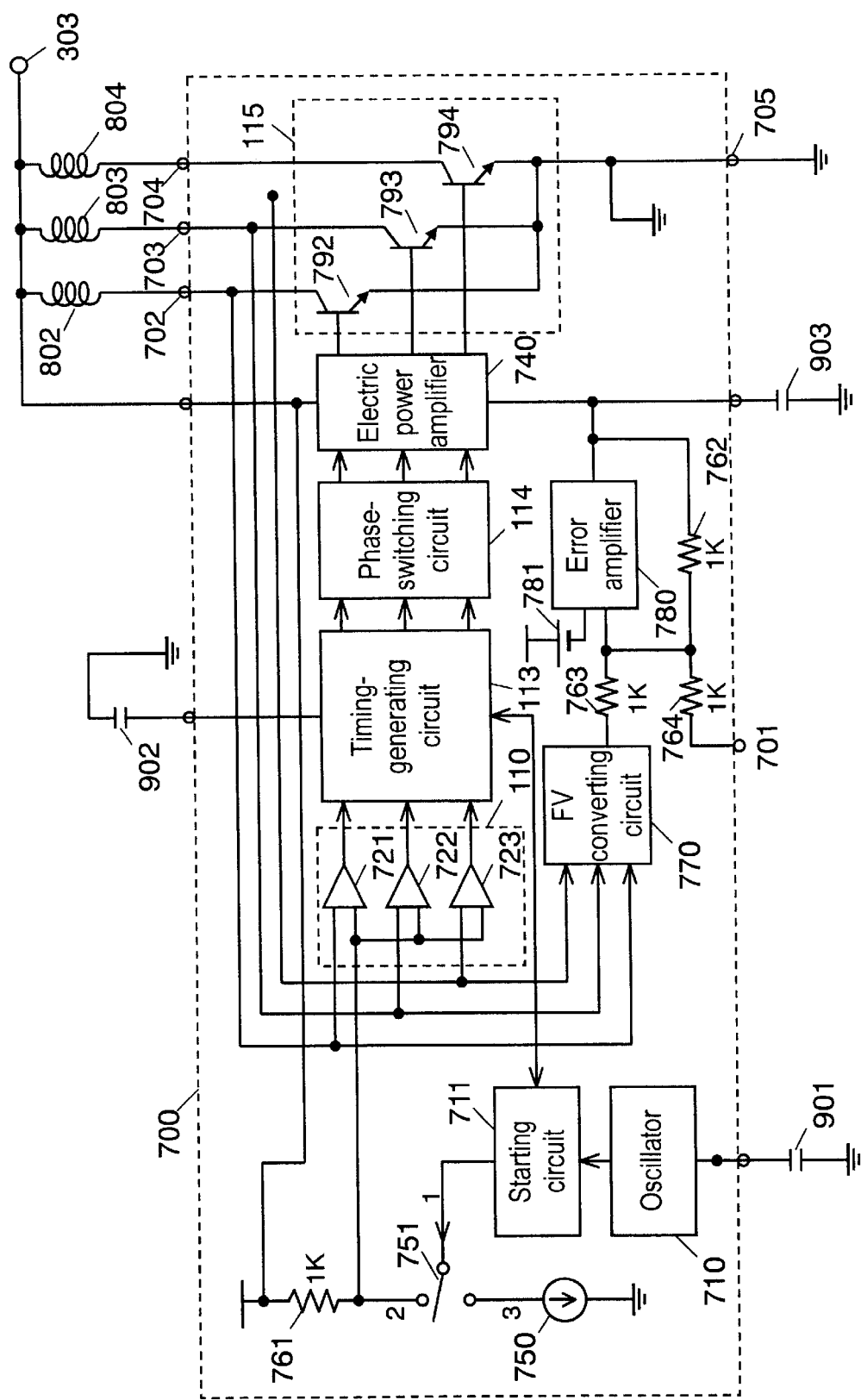
FIG. 12 is a driving circuit diagram of a vibration motor (sensorless-brushless-motor) in accordance with a first conventional example.
Figure 13:
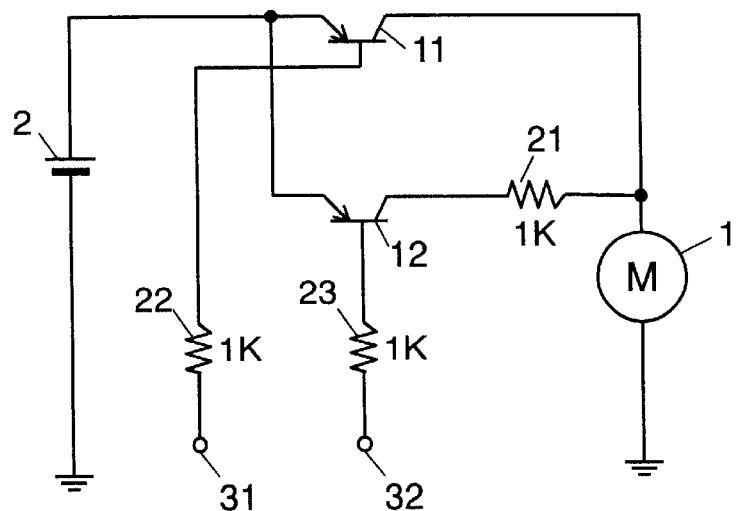
FIG. 13 is a circuit diagram of a vibration device in accordance with a second conventional example.
Figure 14:
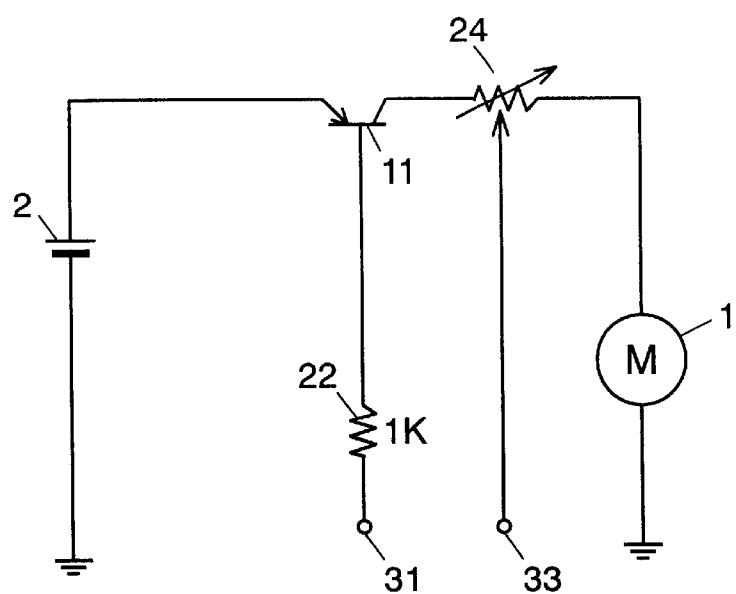
FIG. 14 is a circuit diagram of a vibration device in accordance with a third conventional example.
Figure 15:
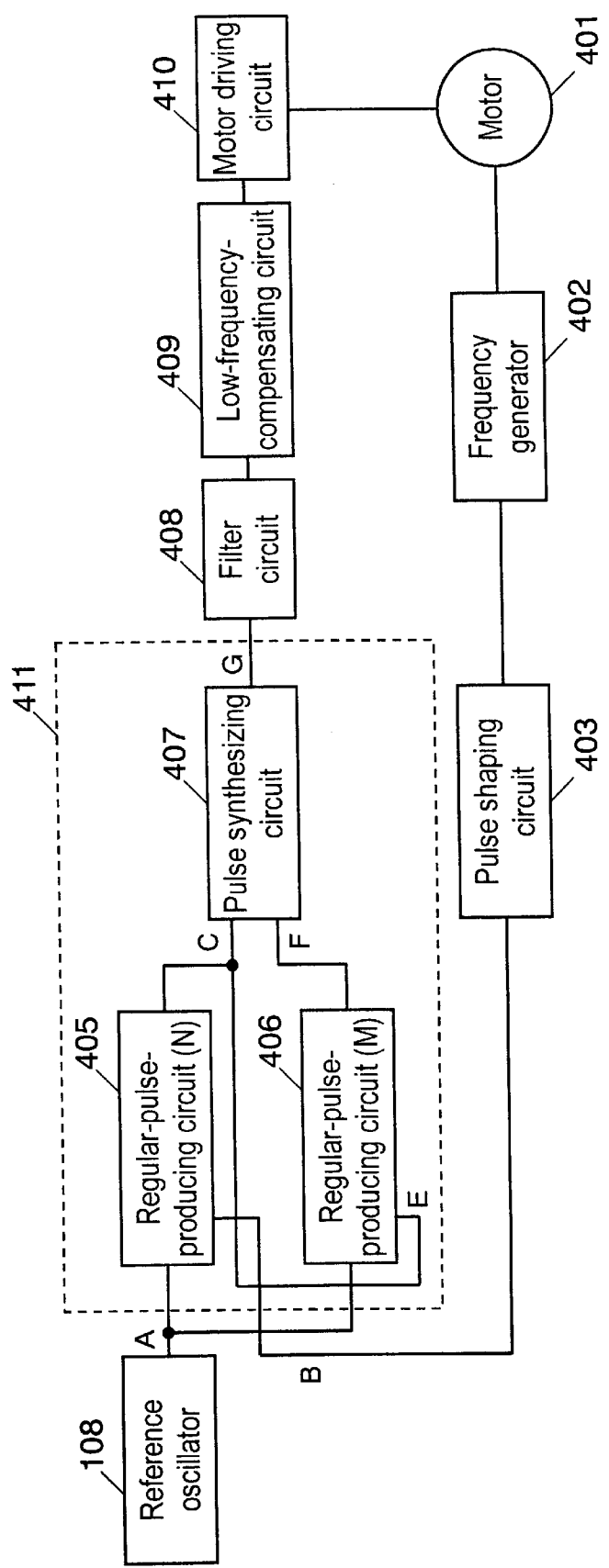
FIG. 15 is a speed-control circuit diagram of a vibration device in accordance with a fourth conventional example.
Figure 16:
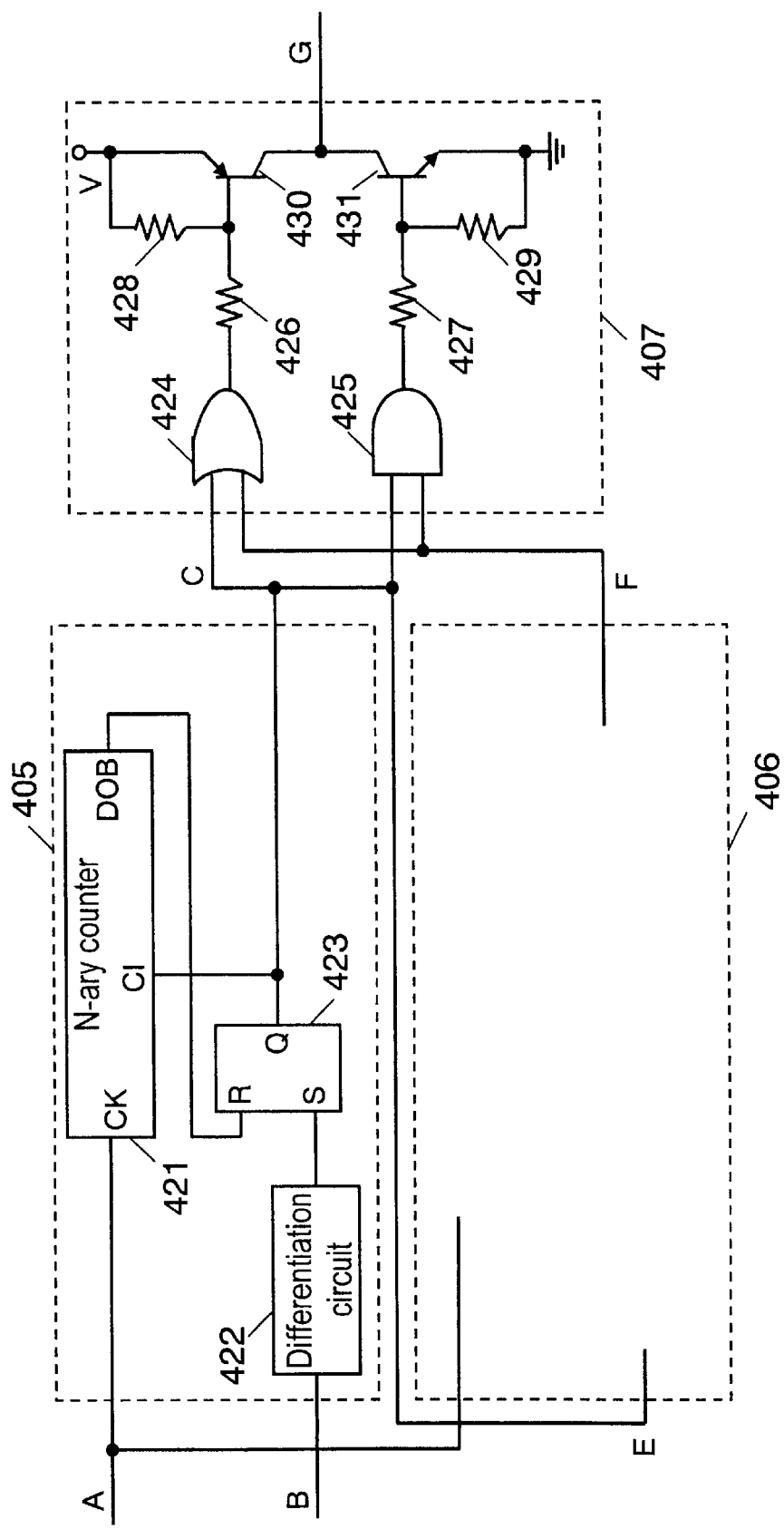
FIG. 16 is a diagram of a speed-error-detecting circuit of the vibration device in accordance with the fourth conventional example.

FIG. 11 is a partial sectional view of an apparatus (cellular phone) in accordance with the seventh exemplary embodiment of the present invention. Vibration motor 101 in FIG. 11 can be used any motors in the embodiments previously described. Motor 101 and motor driving IC 700 are mounted on board 70, which is mounted to the apparatus. As the embodiments previously described, motor 101 has advantages for downsizing, saving spaces, saving power and having additional functions, whereby an apparatus comprising motor 101 also has the same advantages.

This invention described above uses a speed control method of vibration motor, i.e., the method compares a reference clock supplied from a reference oscillator with a cycle of back-electromotive-force (BEMF) of a motor, and controls speed by feeding back the resultant difference. An r.p.m. of the motor keeps constant depending on oscillation accuracy of the reference oscillator, whereby the vibration motor of this invention can realize extreme accurate speed control.

In this invention, the r.p.m. of the motor does not depend on kinds of the motors or dispersion of the motor, so that setting an r.p.m. of the motor can be performed easily and the r.p.m. accuracy is improved.

Torque ripple generated from the vibration motor is increased by omitting periods which was originally required for powering, so that insufficient vibration due to downsizing can be compensated by the control system.

A FAST signal is output only when an r.p.m. of the motor is faster than a reference speed, whereby the structure of the circuit can be simplified, and the circuit can be downsized and produced at a low cost.

An exterior component, e.g., a resistor and a capacitor and the like, is unnecessary, because the motor driver can be formed of only a one chip semiconductor device, so that the apparatus having the motor can be downsized to save more space.

The r.p.m. can be set arbitrarily because a reference cycle can be set arbitrarily by supplying a reference cycle, i.e., a reference speed of the vibration motor from outside.

The r.p.m. is variable easily and vibration magnitude is variable by setting a control terminal for changing the r.p.m. arbitrarily with direct current voltage level from outside, e.g., using an analog voltage supplied to a speaker of a cellular phone.

The relation between a variety of an r.p.m and signals supplied from outside can be linear. Besides this relation, a relation which changes an r.p.m. responsive to vibration, e.g., a variation of an r.p.m. is moderated at a higher rotation speed, can be set.

Users feel changes of vibration effectively by reducing and increasing speed suddenly, whereby insufficient vibration due to downsizing is compensated.

The life of a battery lengthens by breaking current when the motor is at rest.

The apparatus can be downsized to save more space, because a one chip semiconductor device exclusive for driving a vibration motor is unnecessary.

The motor and the apparatus having the motor of this invention have various advantages described above.

Industrial Applicability

A vibration motor obtains a FAST signal when r.p.m. of the motor is faster than reference speed, whereby an output-driving circuit is controlled by the FAST signal to omit parts of the powering periods of respective phases. The motor thus controls the r.p.m. and increases torque ripple generated from the motor. As a result, vibration magnitude increases and insufficient vibration due to downsizing of the motor can be compensated by the control system. A motor driver can be formed of as a one chip semiconductor device, so that the number of exterior components is reduced and the motor can be downsized and light weight The present invention is applied to an information apparatus which transmits information to a user by body sensation of vibration. For example, the present invention can be applied for a cellular phone, an information terminal, a watch and so on.

What is claim is:

1. A vibration motor comprising:
   (a) a rotor having an unbalanced load;
   (b) a stator having a plurality of coils having different phases respectively;
   (c) a motor driver coupled with the coils and rotating said rotor, said motor driver including;
      (c-1) a starting-circuit for applying starting torque to said vibration motor;
      (c-2) a back-electromotive-force(BEMF)-detecting circuit for detecting BEMF of each phase of said vibration motor and outputting a BEMF detecting signal corresponding to the BEMF;
      (c-3) an output-driving circuit having;
         a timing-generating circuit for producing at least one signal to switch an ON-OFF state sequentially for the coils based on the BEMF detecting signal,
      (c-4) a speed-controlling circuit having a reference-cycle-generating circuit for generating a reference cycle signal and a cycle-comparing circuit for comparing a cycle of the reference cycle signal with a cycle of the BEMF detecting signal so that an ON-OFF period to power said coils is effected responsive to output from said speed controlling circuit.

2. The vibration motor of claim 1, wherein said speed-controlling circuit outputs a FAST signal corresponding to a difference between the cycle of the BEMF detecting signal and the cycle of the reference cycle signal when the cycle of the BEMF detecting signal is shorter than that of the reference cycle signal so that the ON-OFF period to power said coils is effected during a FAST signal period of said FAST signal.

3. The vibration motor of claim 2, wherein said output-driving circuit further comprises a gain-adjusting circuit which outputs a signal to stop powering to the coils during a period in proportion to the FAST signal period.

4. The vibration motor of claim 1, wherein said motor driver comprises a one chip semiconductor device, and a starting frequency of said starting circuit is produced based on a signal of a reference oscillator formed in the one chip semiconductor device.

5. The vibration motor of claim 1, wherein said motor driver comprises a one chip semiconductor device, and the reference cycle signal of said speed controlling circuit is produced based on a signal of a reference oscillator formed in the one chip semiconductor device.

6. The vibration motor of claim 1, wherein the reference cycle signal of said speed controlling circuit is produced based on a reference clock supplied from outside said motor.

7. The vibration motor of claim 1, wherein the reference cycle signal of said speed controlling circuit is variable by a direct current voltage supplied from outside said motor.

8. The vibration motor of claim 1,
   wherein said speed controlling circuit has a structure which receives a reference clock from a reference oscillator as an input signal and produces the reference cycle signal by a counter which is set at an arbitrary count number,
   the reference-cycle-generating circuit has a count number setting circuit which receives an N bit signal and can set the arbitrary count number by modifying the N bit signal, whereby the reference-cycle-generating circuit outputs the reference cycle signal.

9. The vibration motor of claim 1, wherein a starting frequency of said starting circuit is produced based on a signal of a reference oscillator, and the reference cycle signal of said speed controlling circuit is also produced based on the signal of the reference oscillator.

10. The vibration motor of claim 1, wherein said motor driver comprises a structure for shorting output stages of every phase of said vibration motor.

11. The vibration motor of claim 1, wherein said motor driver comprises a structure for rotating said vibration motor forward and in reverse.

12. The vibration motor of claim 1, wherein said motor driver comprises a structure for breaking a driving current for said vibration motor and breaking a supplied current for every circuit forming said motor driver simultaneously.

13. The vibration motor of claim 1, wherein said motor driver is provided in a system-control-integrated-circuit employed in an apparatus having said vibration motor.

14. An apparatus using a vibration motor:
   said vibration motor comprising:
      (a) a rotor having an unbalanced load;
      (b) a stator having a plurality of coils having different phases respectively;
      (c) a motor driver coupled with the coils and rotating said rotor, said motor driver including;
         (c-1) a starting-circuit for applying starting torque to said vibration motor;
         (c-2) a back-electromotive-force(BEMF)-detecting circuit for detecting BEMF of each phase of said vibration motor and outputting a BEMF detecting signal corresponding to the BEMF;
         (c-3) an output-driving circuit having;
            a timing-generating circuit for producing at least one signal to switch an ON-OFF state sequentially for the coils based on the BEMF detecting signal, (c-4) a speed-controlling circuit having a reference-cycle-generating circuit for generating a reference cycle signal and a cycle-comparing circuit for comparing a cycle of the reference cycle signal with a cycle of the BEMF detecting signal so that an ON-OFF period to power said coils is effected responsive to output from said cycle comparing circuit.

15. An apparatus using a vibration motor according to claim 14, wherein said speed-controlling circuit outputs a FAST signal corresponding to a difference between the cycle of the BEMF detecting signal and the cycle of the reference cycle signal when the cycle of the BEMF detecting signal is shorter than that of the reference cycle signal so that the ON-OFF period to power said coils is effected during a FAST signal period of said FAST signal.

16. The apparatus of claim 15, wherein said output-driving circuit further comprises a gain-adjusting circuit which outputs a signal to stop powering to the coils during a period in proportion to the FAST signal period.

17. The apparatus of claim 14, wherein said motor driver comprises a one chip semiconductor device, and a starting frequency of said starting circuit is produced based on a signal of a reference oscillator formed in the one chip semiconductor device.

18. The apparatus of claim 14, wherein said motor driver comprises a one chip semiconductor device, and the reference cycle signal of said speed controlling circuit is produced based on a signal of a reference oscillator formed in the one chip semiconductor device.

19. The apparatus of claim 14, wherein the reference cycle signal of said speed controlling circuit is produced based on a reference clock supplied from outside said motor.

20. The apparatus of claim 14, wherein the reference cycle signal of said speed controlling circuit is variable by a direct current voltage supplied from outside said motor.

21. The apparatus of claim 14, wherein said speed controlling circuit has a structure which receives a reference clock from a reference oscillator as an input signal and produces the reference cycle signal by a counter which is set at an arbitrary count number, the reference-cycle-generating circuit has a count number setting circuit which receives an N bit signal and can set the arbitrary count number by modifying the N bit signal, whereby the reference-cycle-generating circuit outputs the reference cycle signal.

22. The apparatus of claim 14, wherein a starting frequency of said starting circuit is produced based on a signal of a reference oscillator, and the reference cycle signal of said speed controlling circuit is also produced based on the signal of the reference oscillator.

23. The apparatus of claim 14, wherein said motor driver comprises a structure for shorting output stages of every phase of said vibration motor.

24. The apparatus of claim 14, wherein said motor driver comprises a structure for rotating said vibration motor forward and in reverse.

25. The apparatus of claim 14, wherein said motor driver comprises a structure for breaking a driving current for said vibration motor and breaking a supplied current for every circuit forming said motor driver simultaneously.

26. The apparatus of claim 14, wherein said motor driver is provided in a system-control-integrated-circuit employed in an apparatus having said vibration motor.

27. The apparatus of claim 14, wherein said apparatus is an information apparatus.

* * * * *